US00RE35101E

United States Patent [19]

Kelly

[11] E Patent Number: Re. 35,101

[45] Reissued Date of Patent: Nov. 28, 1995

[54] FUEL INJECTOR METHOD AND APPARATUS

[75] Inventor: William W. Kelly, Granby, Conn.

[73] Assignee: Stanadyne Automotive Corp., Windsor, Conn.

[21] Appl. No.: 11,407

[22] Filed: Jan. 29, 1993

Related U.S. Patent Documents

Reissue of:

[64] Patent No.: 4,987,887
Issued: Jan. 19, 1991
Appl. No.: 562,617
Filed: Aug. 3, 1990

U.S. Applications:

[63] Continuation-in-part of Ser. No. 500,714, Mar. 28, 1990, Pat. No. 5,020,500.

[51] Int. Cl.[6] ..... F02M 41/00

[52] U.S. Cl. ..... 123/467; 123/446; 239/464; 239/253

[58] Field of Search ..... 123/446, 447, 123/467, 445, 496; 239/452, 453, 464, 88–96, 533.2–533.12

[56] References Cited

U.S. PATENT DOCUMENTS

| | | |
|---|---|---|
| 1,944,371 | 1/1934 | Ritz . |
| 2,588,485 | 3/1952 | Clarke et al. . |
| 2,627,254 | 2/1953 | De Juhasz . |
| 3,032,279 | 5/1962 | Czarnecki . |
| 3,368,761 | 2/1968 | Pelizzoni . |
| 3,838,821 | 10/1974 | Berlyn . |
| 4,036,192 | 7/1977 | Nakayama . |
| 4,284,049 | 8/1981 | Chmela . |
| 4,394,972 | 7/1983 | Potter . |
| 4,436,247 | 3/1984 | Akagi . |
| 4,470,548 | 9/1984 | Ushimura . |
| 4,506,833 | 3/1985 | Yoneda et al. . |
| 4,524,914 | 6/1985 | Kaibura et al. . |
| 4,540,126 | 9/1985 | Yoneda et al. . |
| 4,627,571 | 12/1986 | Kato et al. . |
| 4,629,127 | 12/1986 | Kawamura et al. . |
| 4,684,067 | 8/1987 | Cotter et al. . |
| 4,693,420 | 9/1987 | Klomp . |
| 4,811,715 | 3/1989 | Djordjevic et al. . |
| 4,957,085 | 9/1990 | Sverdlin . |
| B1 4,715,541 | 8/1991 | Freudenschuss et al. . |

FOREIGN PATENT DOCUMENTS

| | | |
|---|---|---|
| 46c3I3503Ahm. | 5/1951 | Germany . |
| 3113755 | 12/1982 | Germany . |
| 59-93959 | 5/1984 | Japan . |
| 136453 | 7/1952 | Sweden . |

*Primary Examiner*—Carl S. Miller
*Attorney, Agent, or Firm*—Chilton, Alix & Van Kirk

[57] ABSTRACT

One spring and two spring embodimenls of a fuel injection having a nozzle body and needle valve with cooperating inner and outer metering rings providing a metering passage which (a) meters fuel at a reduced rate during an initial increment of valve lift, (b) assists in maintaining fuel pressure at the valve seat to reduce fuel dribble and cavitation erosion during a corresponding last increment or valve closure and (c) dampens secondary pressure waves to prevent secondary fuel injection.

32 Claims, 4 Drawing Sheets

FUEL INJECTOR METHOD AND APPARATUS

Matter enclosed in heavy brackets [ ] appears in the original patent but forms no part of this reissue specification; matter printed in italics indicates the additions made by reissue.

RELATED APPLICATION

This application is a continuation in part of pending U.S. application Ser. No. 500,714, filed Mar. 28, 1990, *now U.S. Pat. No. 5,020,500,* and entitled "Hole Type Fuel Injector And Injection Method".

BACKGROUND AND SUMMARY OF THE INVENTION

The present invention relates generally to diesel engine fuel injection and relates more particularly to method and apparatus for shaping the rate of fuel injection A principal object or the present invention is to provide new and improved method and apparatus in a fuel injector for reducing or regulating the rate or fuel injection during an initial stage of injection.

Another object of tile present invention is to provide new and improved method and apparatus in a fuel injector for injecting an initial reduced charge for pre-injection.

A further object of the present invention is to provide new and improved method and apparatus in a fuel injection for metering fuel during an initial stage or injection.

A further object of the present invention is to provide new and improved method and apparatus in a fuel injection for assisting in maintaining fuel pressure at the injection valve seat until valve closure to reduce or eliminate secondary fuel injection, end or injection fuel dribble and cavitation erosion at the valve seat and adjacent area.

A further object of the present invention is to provide a new and improved two stage fuel injector having a regulated or reduced rate or fuel injection during a first stage of injection. In accordance with the present invention, the two stage fuel injector may employ one or two (or more) valve closure springs. In the two spring embodiment, only one spring is effective when the injector needle valve is closed and as the needle valve is opened to a predetermined intermediate position. Both springs are effective as the needle valve is opened from that intermediate position to its fully open position. In a single spring embodiment, a single spring is effective when the needle valve is closed and as the needle valve is opened to its fully open position. In both versions, during a first stage or needle valve operation, fuel rate shaping is provided in a manner which does not rely on fuel metering between the needle valve and its valve seat and which is substantially insensitive to slight variations in needle valve lift.

A further object of the present invention is to provide a new and improved fuel injector which fulfills one or more or the foregoing objects of the present invention and which can be economically manufactured on a mass production basis.

Other objects of the present invention will be in part obvious and in part pointed out more in detail hereinafter.

A better understanding of the invention will be obtained from the following detailed description and accompanying drawings of preferred embodiments of the present invention.

DESCRIPTION OF PREFERRED EMBODIMENTS

Figure 1:
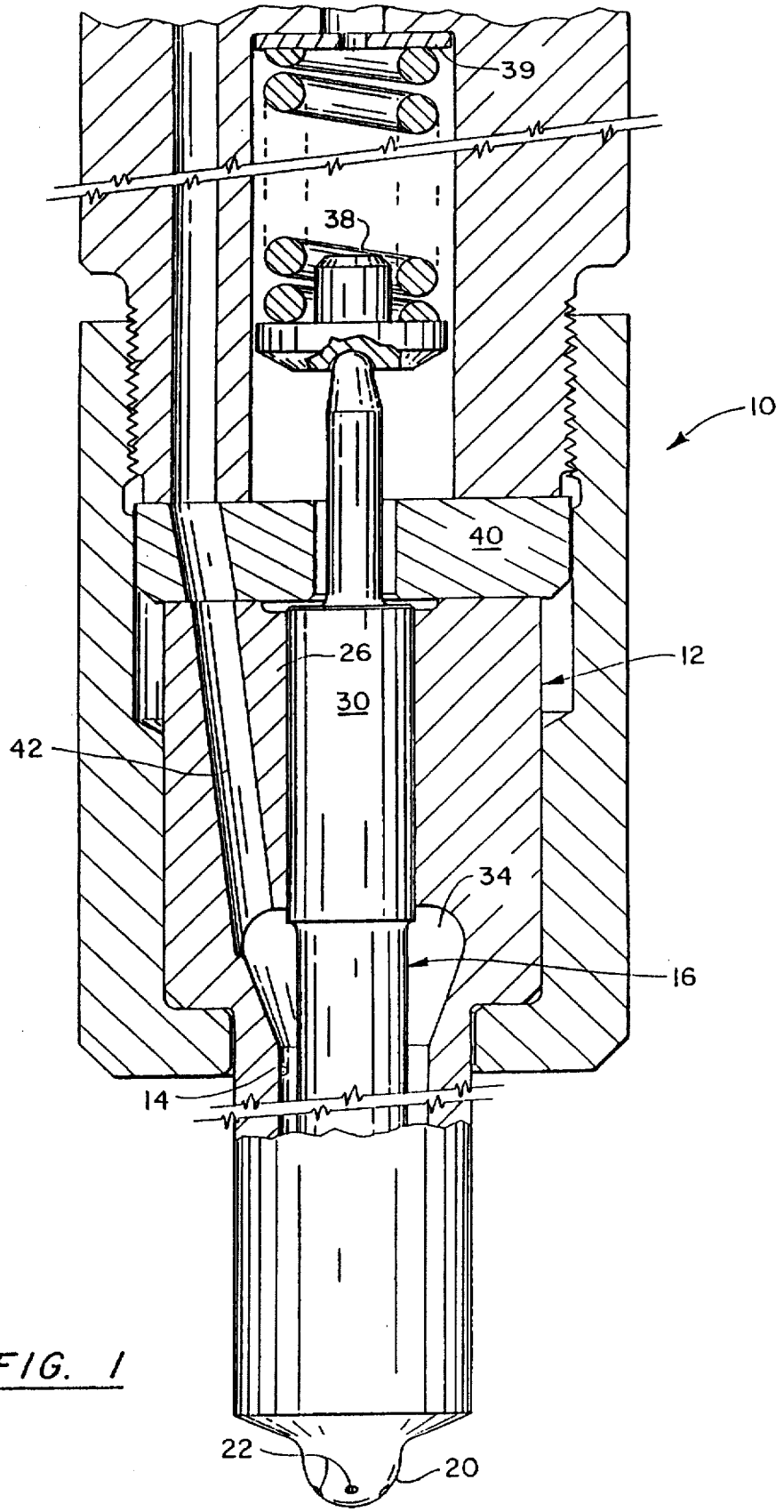
FIG. 1 is a longitudinal section view, partly broken away and partly in section, of a single spring fuel injector incorporating an embodiment of the present invention.
Figure 2:
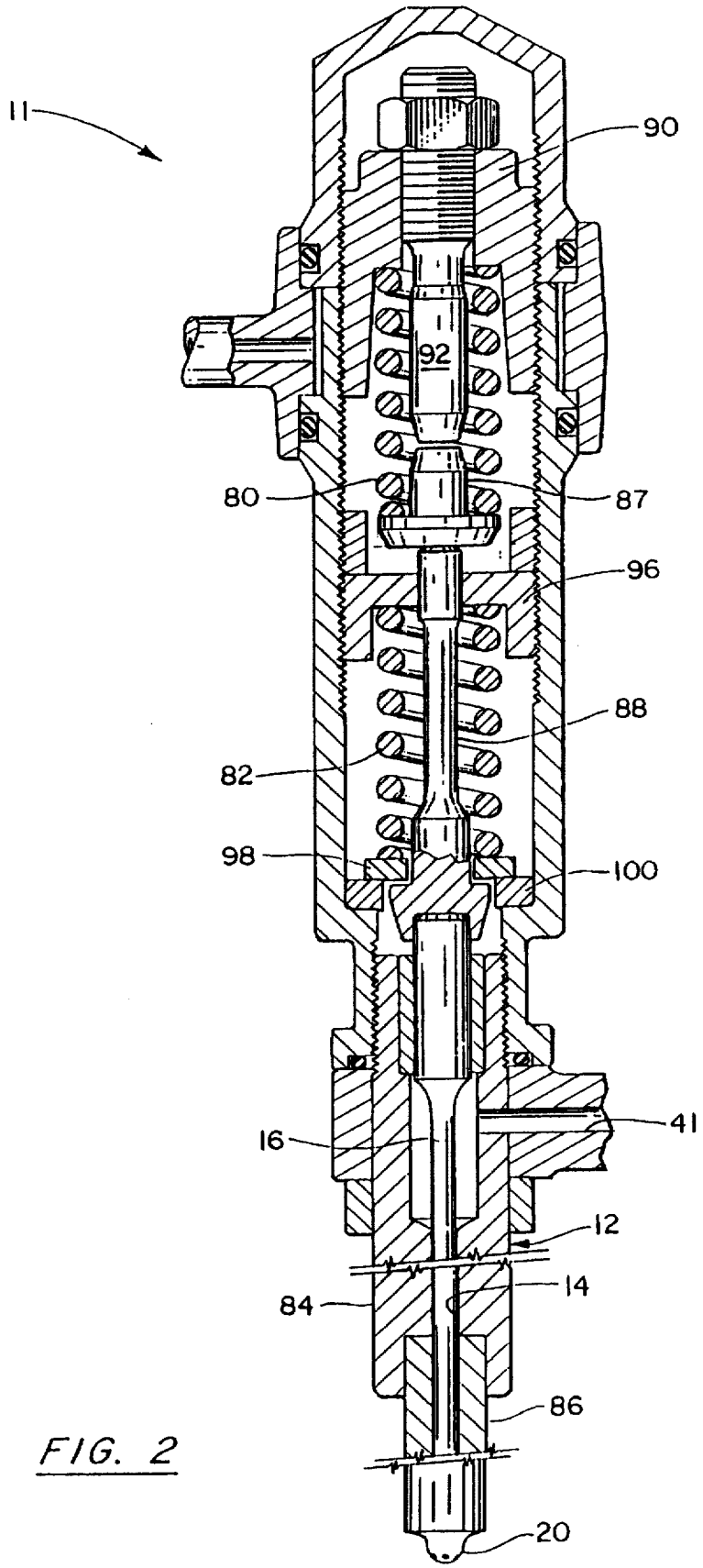
FIG. 2 is a longitudinal section view, partly broken away and partly in section, of a two spring fuel injector incorporating another embodiment of tile present invention.

In tile drawings, like numerals are used to represent the same or like parts or like functioning parts. FIGS. 1 and 2 show two exemplary fuel injectors 10, 11 which incorporate embodiments of the present invention. Each injector 10, 11 comprises an elongated nozzle body 12 with an elongated valve bore 14 and an elongated nozzle needle valve 16 axially reciprocable within the valve bore 14. In injector 10, the nozzle body 12 is formed as one piece, whereas in injector 11, the nozzle body 12 comprises an upper, elongated body subassembly 84 and a lower elongated, body part 86 having an outer diameter substantially less than that of the upper body subassembly 84. The nozzle body 12 of each injector 10, 11 has a lower end tip 20 coaxial with and enclosing the lower end of the valve bore 14. The nozzle body 12 of each injector 10, 11 has an internal, upwardly facing, coaxial conical surface 18 providing an annular needle contact area or valve seat 19 immediately above the nozzle tip 20. In each injector 10, 11, the needle valve 16 has a lower conical end with approximately line contact with the conical surface 18 when the valve is closed.

In each injector 10, 11, one or more small diameter spray holes 22 are provided below the valve seat 19 in the end tip 20. In the alternative (not shown), one or more spray holes 22 may be provided in the conical surface 18 below tile valve seat 19. In a conventional manner, the spray holes 22 provide for spraying small droplets of fuel for combustion. The number, diameter and exact location of the spray holes 22 are selected for each application.

Injector 10 has a single valve closure spring 38 whereas injector 11 has two valve closure springs 80, 82. In injector 10, the single coil compression spring 38 is mounted above the needle valve 16 to constantly urge the needle valve 16 downwardly to its closed position. In injector 11, the first or upper coil compression spring 80 is mounted above the needle valve 16 to constantly urge the needle valve 16 downwardly to its closed position via a spring seat 87 and an intermediate pin 88. The second or lower coil compression spring 82 is effective, also via the intermediate pin 88, to urge the needle valve 16 downwardly as the needle valve 16 is lifted above a predetermined intermediate position.

In the single spring injector 10, a shim 39 is employed to precisely set the preload of the valve spring 38 and thereby precisely establish the valve opening pressure (i.e., the pressure at which the needle valve 16 begins to lift off the valve seat 19). An adaptor plate 40 mounted on the nozzle body 12 serves as a stop engageable by an upper guide 30 of the needle valve 16 to limit valve lift.

In the two spring injector 11, the upper spring seat 87 and the intermediate pin 88 are mounted between the needle valve 16 and an externally threaded, central stop 92. The stop 92 is adjustable to set the maximum valve lift. A first, externally threaded spring seat 90 is adjustable to precisely set the preload of the upper spring 80 and thereby precisely establish the valve opening pressure. A second, externally threaded spring seat 96 is adjustable to precisely set the preload of the lower spring 82. With the needle valve 16 closed, a lower spring seat 98 of the lower spring 82 rests on a separate annular washer or shim 100. When the needle valve 16 is lifted to a predetermined intermediate position having a predetermined intermediate lift established by the thickness of the annular shim 100, the intermediate pin 88 engages tile lower spring seat 98 of the lower spring 82. That predetermined intermediate lift preferably is slightly less than one-half the maximum valve lift.

Injectors 10, 11 are hole type injectors. In each injector, the needle valve 16 has a predetermined maximum lift which is preferably within the usual range of maximum lift of 0.008 to 0.016 inch of such hole type injectors.

Apart from the different effects provided by the different spring mechanisms employed in the two injectors 10, 11, even though the injectors 10, 11 are otherwise structurally different, both injectors 10, 11 provide the same general type of two stage valve operation hereinafter described. And tile following description concerning the two stage operation is equally applicable to both injectors 10, 11 except where otherwise indicated.

The nozzle body 12 has upper and lower, coaxial valve guides or rings 26, 28 which cooperate with upper and lower, coaxial guides or rings 30, 32 of the needle valve 16 to guide the reciprocal movement of the needle valve 16. The upper valve guide 26 is located at the top of the nozzle body 12 and the lower valve guide 28 is spaced below the upper valve guide 26 and above the . valve seat 19. An upper annular fuel chamber 34 surrounding the needle valve 16 is provided between the upper and lower valve guides 26, 28. A lower annular fuel chamber 36 surrounding the needle valve 16 is provided between the lower valve guide 28 and valve: seat 19.

The diameter of the upper guide 30 of the needle valve 16 is larger than the diameter of the annular valve seat 19 to provide a differential area for hydraulically lifting the needle valve 16 from the valve seat 19 for fuel injection. The needle valve 16 is periodically actuated by high pressure pulses of fuel supplied to the upper annular chamber 34 via a radial port 41 in the nozzle body 12 (FIG. 2) or one or more internal fuel passages 42 in the nozzle body 12 (FIG. 1). As hereinafter more fully described, each high pressure pulse acts on the differential area between the upper guide 30 and valve seat 19 to open the needle valve 16 and to supply fuel for fuel injection through the spray holes 22.

In a hole type nozzle, in most applications the high pressure pulses typically have a maximum pressure within a range of 4,000 to 17,000 psi. That maximum pressure and the valve opening pressure are functions of the spring characteristics and preload setting of each valve, closure spring (i.e., spring 38 of injector 10 and springs 80, 82 of injector 11) and the shape of the high pressure pulse. In a single spring injector, the valve opening pressure typically is within the range of 2,800 to 5,000 psi. In a two spring injector, the valve opening pressure typically is within the range of 2,500 to 3,000 psi. The pressure required to raise the needle valve from in predetermined intermediate position against the preload of the second spring 82 in addition to the bias of the first spring 80 typically is within the range of 3,400 to 5,800 psi.

The lower guide 32 of the needle valve 16 cooperates with the lower fixed valve guide 28 to restrict or throttle fuel flow between the upper and lower fuel chambers 34, 36 during part of the reciproeable movement of the needle valve 16. Regulation is provided during an initial upward increment of travel and a corresponding last downward increment of travel of the needle valve 16. That increment is preferably within the range of approximately 0.004 to 0.008 inch or approximately one-half the maximum lift of the needle valve 16.

The lower guide 32 of the needle valve 16 has upper and lower spaced sections 50, 52 with outer cylindrical surfaces. The lower section 52 has three equiangularly spaced, axially extending flats 54 providing axial passages for unrestricted fuel flow. A conical surface 56, in combination with the flats M, provides a peripheral annulus between the spaced sections 50, 52 for connecting the upper ends of the three axial passages.

The lower part of the upper section 50 forms an inner metering ring 60 that is received within an outer metering ring 62 formed by the lower fixed guide 28 when the needle valve 16 is seated. The inner metering ring 60 is formed by an external cylindrical meteting surface having a lower circular meteting edge 64. The outer, fixed metering ring 62 is formed by an internal cylindrical metering surface having an upper circular metering edge 66. Each metering edge 64, 66 is a sharp edge formed in the shown embodiments by the respective cylindrical metering ring 60, 62 and adjacent perpendicular shoulder. A clearance passage 68 having a radial clearance b is provided between the two opposing cylindrical metering rings 60, 62. The diametrical clearance between the two metering rings 60, 62 in each of the shown embodiments is preferably within the range of 0.0003 to 0.0006 inch.

The lower guide section 52 is provided to maintain the concentricity of the inner and outer metering rings 60, 62. For nozzles which do not need a lower guide section 52 for that purpose, the lower guide section 52 and intermediate conical surface 56 may be excluded and the axial length of the lower valve guide 28 may be reduced accordingly.

Figure 4:
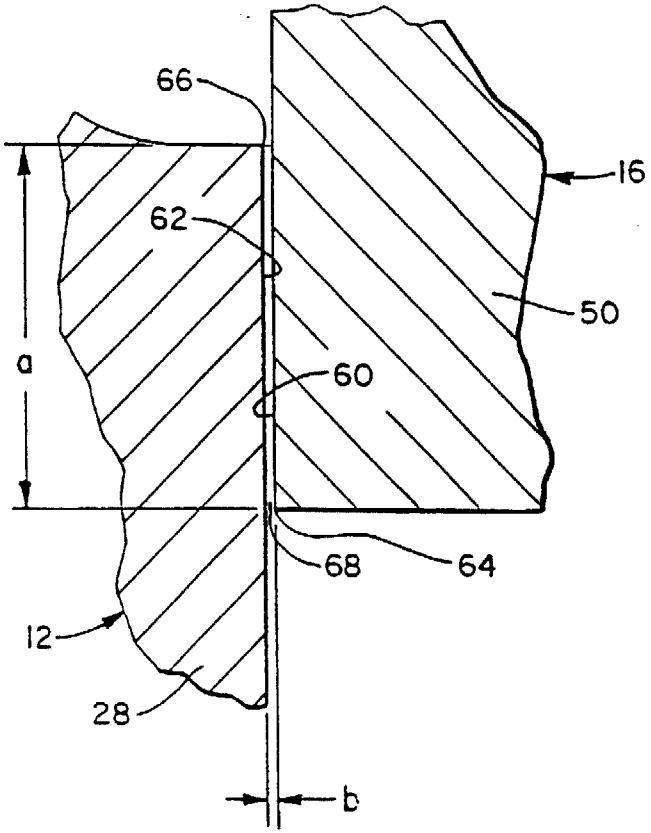
FIG. 4 is an enlarged longitudinal sectional view, partly broken away and partly in section, of the nozzle body and needle valve of FIG. 3, showing the relationship of inner and outer metering rings and metering edges of the nozzle body and needle valve when the needle valve is closed.
Figure 3:
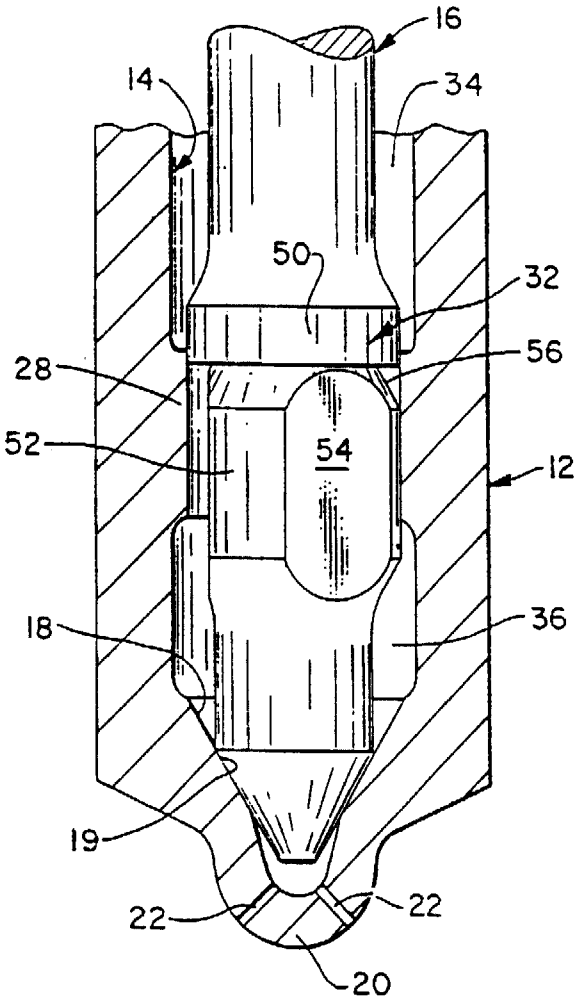
FIG. 3 is an enlarged longitudinal section view, partly broken away and partly in section, of similar parts of the nozzle body and nozzle needle valve of the fuel injectors of FIG. 1 and FIG. 2.

The inner and outer meteting rings 60, 62 cooperate to regulate flow between the upper and lower chambers 34, 36 during part of the upward and downward movement of the needle valve 16. How metering or throttling occurs during an initial increment of needle valve lift and a corresponding last increment of needle valve closure. For example, with the valve closed as shown in FIGS. 3 and 4, if the axial overlap a of the metering edges 64, 66 is 0.006 inch (i.e., metering tings 60, 62 have an axial width or overlap a of 0.006 inch), the annular metering rings 60, 62 cooperate to regulate flow during the initial upward and last downward increments of movement of the needle valve 16 of 0.006 inch. As described, the meteting edges 64, 66 preferably are coaxial, circular edges and the metering rings 60, 62 are formed by cylindrical surfaces. In the alternative (not shown), one or both of the metering rings 60, 62 may have a different shape to provide a more gradual transition between regulated and non-regulated conditions as the needle valve 16 reciprocates.

Prior to valve opening, the pressure in the lower chamber 36 is essentially the same as that in the upper chamber 34. That is so, even during a rapid increase in pressure at the beginning of a high pressure valve operating pulse, because, with the needle valve 16 closed, only extremely little flow through the clearance passage 68 is required to equalize the pressure between the upper and lower chambers 34, 36. However, as the needle valve 16 lifts off the valve seat 19 and fuel flows through the clearance passage 68 and spray holes 22, the lower chamber pressure will be less than the upper chamber pressure due to fuel throttling or metering provided by the clearance passage 68. Accordingly, at any specific upper chamber pressure, the net hydraulic opening bias on the needle valve 16 is less with the needle valve 16 open than closed mid less than it would be if there were no restriction. Consequently, because of the restriction, a higher upper chamber pressure is required to open the needle valve 16 further after it is initially opened. Further valve opening is therefore slowed or delayed for a short but meaningful period during which the rate of fuel injection is metered or throttled by the clearance passage 68.

Figure 5:
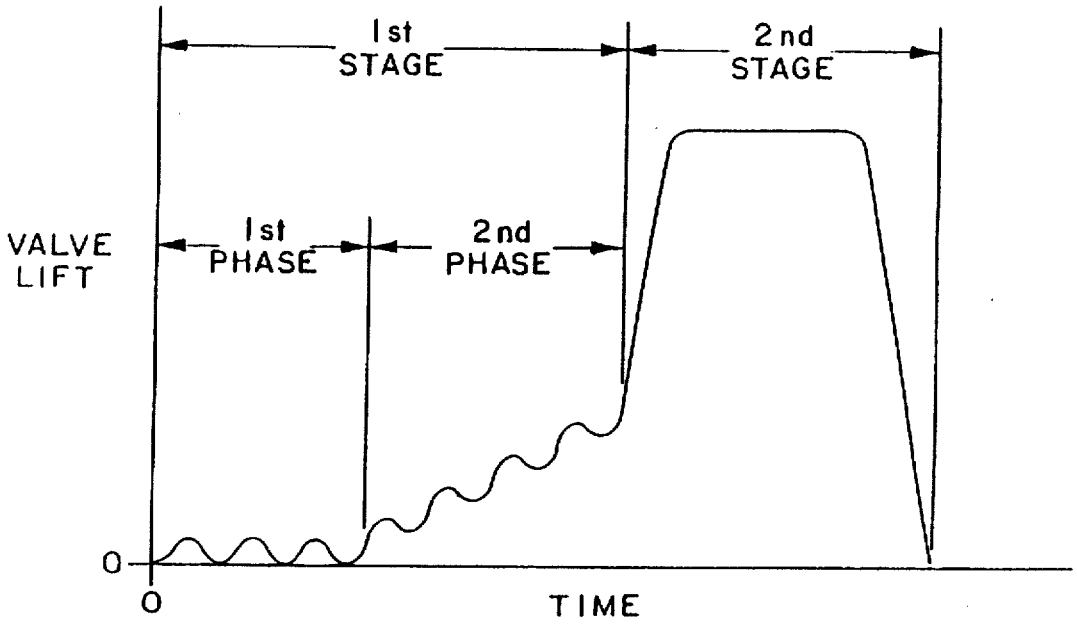
FIG. 5 is a graph showing the relationship of needle valve lift and time during an exemplary fuel injection cycle of the fuel injector of FIG. 1.

Thus, needle valve operation and fuel injection occur in two stages: a first stage of partial needle valve opening during which there is a regulated or reduced rate of fuel injection and a second stage of unthrottled fuel injection. The first stage may have two distinct phases. During a first hfitial opening phase, as the upper chamber pressure rises above the needle valve opening pressure, the needle valve may modulate or dither briefly between closed and partly open positions. Valve modulation continues during a succeeding second phase after the upper chamber pressure reaches a level sufficient to keep the needle valve 16 from closing. In the single spring injector 10, second phase needle valve modulation continues until the total needle valve opening force produced by the different fuel pressures in the upper and lower chambers 34, 36 is sufficient to propel the needle valve 16 upward to its fully open position. A representative fuel injection cycle of the single spring injector 10 is illustrated in FIG. 5. In the two spring injector 11, second phase needle valve modulation continues until the total valve opening force is sufficient to lift the needle valve 16 to its predetermined intermediate position where the pin 88 engages the lower spring seat 98 of the second spring 82. After a short delay until the total needle valve opening force is sufficient to overcome the preload of the second spring 82, the needle valve 16 is propelled to its fully open position. Thus, this short delay adds a third phase to the first stage of fuel injection.

The diameter of the lower guide 32 is selected to provide the desired valve modulation. At one extreme, if the diameter of the lower guide 32 is less than or equal to the diameter of the valve seat 19, there will be no first stage valve modulation. Instead, in the single spring injector 10, the needle valve 16 will be propelled to its fully open position in a single step. In the two spring injector 11, the needle valve 16 will be propelled initially to its predetermined intermediate position where the second spring 82 becomes effective. After the short delay described above, the needle valve 16 will be propelled to its fully open position. At the other extreme, if the diameter of the lower guide 32 is equal to or greater than the diameter of the upper guide 30, in both injectors 10, 11, the needle valve 16 will dither or fluctuate between closed and partly open positions and never fully open. Although needle valve operation provided by one of those extreme conditions may be desirable in certain applications, in general the diameter of the lower guide 32 should lie in a central range between the diameter of the valve seat 19 and upper guide 30.

The two stage valve operation is affected by the pressure/time curve or shape of the high pressure fuel pulse supplied to tile upper fuel chamber 34. For any given fuel injection system, the pulse sixape varies with engine speed. At higher engine speeds, the pressure of the supplied high pressure pulse increases more rapidly, thereby giving less time for effective first stage operation to occur. As a result, in the single spring injector 10, first stage valve operation typically is more pronounced at lower RPM. In the two spring injector 11, first stage operation can be achieved throughout the desired engine speed range by proper selection of the intermediate valve lift and by employing springs 80, 82 with an appropriate preload and spring rate.

Certain nozzle dimensions or parameters are established for each application to provide the desired two stage and two phase operation. For a typical automotive diesel engine application (e.g., a four cylinder, two liter, engine with injectors which directly inject a charge having a maximum volume of approximately 40 $mm^3$ and which are operated by high pressure pulses having a maximum pressure, which varies with engine speed, in the range from 5,000 to 14,000 psi), the nozzle parameters and their preferred nominal dimensional ranges are as follows:

| Parameter | Nominal Dimemsional Range |
|---|---|
| Diameter of upper valve guide 26 | 0.150 to 0.180 inch |
| Diameter of lower valve guide 28 | 0.098 to 0.160 inch |
| Diametrical clearance 68 | 0.0003 to 0.0006 inch |
| Diameter of valve seat 19 | 0.079 to 0.104 inch |
| Metering ring width (edge overlap) a | 0.004 to 0.006 inch |
| Maximum valve lift | 0.008 to 0.012 inch |

In the typical automotive diesel engine application described above, it is generally desirable to inject approximately the first 5 $mm^3$ of fuel at n reduced rate to reduce combustion noise and nitrous oxide emissions. Optimum dimensions within the ranges given above are established to achieve that level of first stage injection. In other diesel engine applications, the optimum dimensions may be outside the ranges given.

The axial position of the metering rings 60, 62 relative to the valve seat 19 can affect the two stage operation. In general, it is believed that the meteting rings 60, 62 should be located closer to the valve seat 19 than to the upper guides 26, 30 to reduce the volume of the lower fuel chamber 36 and thereby increase the responsiveness of the needle valve 16 to the metered rate of flow through the clearance passage 68.

As described, the cooperating inner and outer metering rings 60, 62 provide fuel throttling and therefore fuel rate shaping during the First stage of valve operation. First stage fuel regulation is provided in a manner which is substantially insensitive to valve lift since first stage fuel regulation does not rely on fuel metering between the needle valve 16 and valve seat 19. More effective and consistent rate shaping is thereby achieved.

In the two spring injector 11, tirst stage valve operation can be extended to higher speeds and otherwise modified or enhanced as desired. For example, the second spring 82 is effective at an intermediate position having a predetermined intermediate valve lift of 0,004 inch (for use in combination with a metering ring width (edge overlap) a of 0.006 inch and a total valve lift of 0.012 inch). During first stage valve operation, the needle valve 16 is temporarily held at that predetermined intermediate position by the preload of the second spring 82.

During second stage valve operation (for designs employing either one or two needle valve closure springs), the rate of fuel injection is not affected by the metering rings 60, 62. Also, the transition between the first and second stages, during wtdch the cooperating metering rings 60, 62 have varying transitional affect, is extremely quick. During the first stage, valve behavior and the rate of fuel injection are determined primarily by the rate of fuel flow between tile metering rings 60, 62. During the second stage, the needle valve 16 is quickly propelled to and then temporarily held at its fully open position. The width (edge overlap), diameter and configuration of tile metering rings 60, 62, the spring rate and preload of each valve spring and the intermediate valve position are predetermined for each nozzle application to sitape that two stage valve operation as desired.

The metering rings 60, 62 also affect fuel flow during valve closure. During the last increment of valve closure, the two rings 60, 62 cooperate to restrict fuel flow between the upper and lower chambers 34, 36. Also, the lower guide 32 of the needle valve 16 serves as a pump to pressurize fuel in the lower chamber 36 if, as preferred, the inner metering ring 60 has a diameter larger than the valve seat 19. That pumping actlon is affected by the design parameters and other factors discussed above. By that pumping action, the fuel pressure at the spray hole(s) 22 and valve seat 19 is maintained at a higher pressure than otherwise until the needle valve 16 is completely closed. The higher pressure helps eliminate or reduce fuel dribble from the spray hole(s) 22 and helps eliminate or reduce cavitatlon within the lower fuel chamber 36 by helping both to collapse and to prevent vapor cavities which typically form at or near the valve seat 19 during valve closure. Cavitatlon erosion at or adjacent the valve seat 19 is thereby reduced or eliminated. In addition, tile clearance passage 68 dampens the transmission, from the upper chamber 34 to the lower chamber 36, of any secondary pressure waves caused by reflection of the injection pulse and following each injection event. Such dampening eliminates undesirable "secondary" fuel injection and further minimizes cavitation within the lower fuel chamber 36 and thus minimizes cavitation erosion at and near the valve seat 19.

The disclosed exemplary fuel injectors 10, 11 are hole type fuel injectors and are designed to be employed in fuel systems in which a remote high pressure pump is utilized to supply high pressure fuel pulses to the fuel injectors 10, 11 via high pressure fuel lines. The present invention is also readily adaptable to other types of fuel injectors, for example unit injectors employing a high pressure pump as part of each injector assembly and pintle type fuel injectors. In addition, as will be apparent to persons skilled in the art, other modifications, adaptations and variations of the foregoing specific disclosure can be made without departing from the teachings of the present invention.

I claim:

1. A fuel injector comprising a nozzle body with an elongated valve bore, an annular valve seat and longitudinally spaced, coaxial, upper valve guide and lower valve ring above the valve seat; an elongated nozzle needle valve in the valve bore having longitudinally spaced, coaxial, upper guide and lower ring which cooperate with the upper valve guide and lower valve ring respectively of the nozzle body to provide axial movement of the needle valve within the valve bore between a lower closed position in engagement with the valve seat and an upper fully open position with a predetermined maximum lift; the nozzle body having hole means connected to the valve bore below the valve seat for injection of fuel; the nozzle body providing an upper fuel chamber surrounding the needle valve between the upper valve guide and lower valve ring and a lower fuel chamber surrounding tile needle valve between the lower valve ring and valve seat; two stage valve closure spring means biasing the needle valve downwardly into engagement with the valve seat, including first stage spring means holding the needle valve in its closed position and biasing the needle valve downwardly as it is lifted upwardly from its closed to its fully open position and second stage spring means biasing the needle valve downwardly as it is lifted upwardly from a predetermined intermediate position with a predetermined intermediate lift to its fully open position; the upper guide of the needle valve having a greater diameter than the valve seat to provide a differential area for hydraulically opening the needle valve against the bias of the valve closure spring means; the upper fuel chamber being connected to receive periodic high pressure pulses of fuel for opening the needle valve against the bias of the spring means and for supplying fuel for fuel injection through the hole means; the lower valve ring forming an outer metering ring with an internal, annular metering surface with an upper metering edge; the lower ring of the needle valve forming an inner metering ring with an external annular, metering surface with a lower metering edge; the inner metering ring, with the needle valve in its closed position, being received within the outer metering ring with the inner ring metering edge below the outer ring metering edge by a predetermined axial overlap substantially less than said predetermined maximum lift and slightly more than said predetennined intermediate lift and with a predetermined annular clearance between the inner and outer metering surfaces providing a metering passageway to regulate fuel flow between the upper and lower fuel chambers during an initial increment of upward movement of the needle valve from its closed position and to its said intermediate position and to regulate the pressure in the lower fuel chamber during the corresponding last increment of downward movement of the needle valve.

2. A fuel injector according to claim 1 wherein the fuel injector is a hole type injector in which the nozzle body has a nozzle tip below the needle valve enclosing the lower end of the valve bore and said hole means comprises one or more spray holes connected to the valve bore below the valve seat.

3. A fuel injector according to claim 1 wherein said axial overlap is approximately one-half said predetermined maximum lift.

4. A fuel injector according to claim 1 wherein said axial overlap is greater than said predetermined intermediate lift in the range of 0.001 to 0.005 inch.

5. A fuel injector according to claim 1 wherein said clearance is a diametrical clearance in the range of 0.0003 to 0.0006 inch.

6. A fuel injector according to claim 1 wherein said axial overlap is no greater than approximately 0.008 inch.

7. A fuel injector according to claim 1 wherein the outer ring metering edge is circular.

8. A fuel injector according to claim 1 wherein the inner ring metering edge is circular.

9. A fuel injector according to claim 1 wherein the inner ring metering surface is cylindrical.

10. A fuel injector according to claim 1 wherein the outer ring metering surface is cylindrical.

11. A fuel injector according to claim 1 wherein the inner metering ring has a diameter greater than that of the valve seat and less than that of the upper guide of the needle valve.

12. A method of fuel injection with a fuel injector comprising a nozzle body with an elongated valve bore, an annular valve seat and longitudinally spaced, coaxial, upper valve guide and lower valve ring above the valve seat; an elongated needle valve in the valve bore having longitudinally spaced, coaxial, upper guide and lower ring which cooperate with the upper valve guide and lower valve ring respectively of the nozzle body to provide axial movement of the needle valve within the valve bore between a lower dosed position in engagement with the valve seat and an upper fully open position having a predetermined maximum lift; the nozzle body having hole means connected to the valve bore below the valve seat for injection of fuel; the nozzle body providing an upper fuel chamber surrounding the needle valve between the upper valve guide and lower valve ring and a lower fuel chamber surrounding the needle valve between the lower valve ring and valve seat; closure spring means biasing the needle valve downwardly into engagement with the valve seat, including first stage spring means holding the needle valve in its closed position and biasing the needle valve downwardly as it is lifted upwardly from its closed to its fully open position and second stage spring means biasing the needle valve downwardly as it is lifted upwardly from a predetermined intermediate position with a predetermined intermediate lift to its fully open position; the upper guide of the needle valve having a greater diameter than the valve seat to provide a differential area for hydraulically opening the needle valve against the bias of the valve closure spring means; the upper fuel chamber being connected to receive high pressure pulses of fuel for opening the needle valve against the bias of the spring means and for supplying fuel for fuel injection tiaough the hole means; the method comprising the steps of providing a predetermined fuel metering passage between the lower rings of the nozzle body and needle valve for metering fuel between the upper and lower fuel chambers during only an initial increment of upward movement of the needle valve from its closed position substantially less than said predetermined maximum lift and slightly greater than said predetermined intermediate lift, and a corresponding last increment of downward movement of the needle valve, thereby to regulate the rate of fuel injection during said initial increment of upward movement and the pressure in the lower fuel chamber during said last increment of downward movement.

13. A fuel injection method according to claim 12 wherein said initial increment of opening movement is approximately one half said predetermined lift.

14. A fuel injection method according to claim 12 wherein said initial increment of opening movement is greater than said predetermined intermediate lift in the range of 0.001 to 0.005 inch.

15. A fuel injection method according to claim 12 wherein said initial increment of opening movement is in the range of 0.004 to 0.008 inch.

16. A fuel injection method according to claim 12 wherein said predetermined maximum lift is in the range of 0.008 to 0.016 inch.

17. A fuel injection method according to claim 12 wherein said metering passage is provided by an annular clearance passageway between the lower rings of the nozzle body and needle valve having a diametral clearance in the range of 0.0003 to 0.0006 inch.

18. A fuel injection method according to claim 12 wherein the lower ring of the needle valve has a diameter greater than that of the valve seat and less than that of the upper guide of the needle valve.

*19. A fuel injector comprising a nozzle body with an elongated valve bore, an annular valve seat and longitudinally spaced, coaxial, upper valve guide and lower outer valve ring above the valve seat; an elongated nozzle needle valve in the valve bore having longitudinally spaced, coaxial, upper guide and lower inner ring which cooperate with the valve guide and outer ring respectively of the nozzle body to provide axial movement of the needle valve within the valve bore between a lower closed position in engagement with the valve seat and an upper fully open position with a predetermined maximum lift; the nozzle body having hole means connected to the valve bore below the valve seat for injection of fuel; the nozzle body providing an upper fuel chamber surrounding the needle valve between the upper valve guide and outer ring and a lower fuel chamber surrounding the needle valve between the outer ring and valve seat; two stage valve closure spring means biasing the needle valve downwardly into engagement with the valve seat, including first stage spring means holding the needle valve in its closed position and biasing the needle valve downwardly as it is lifted upwardly from its closed to its fully open position and second stage spring means biasing the needle valve downwardly as it is lifted upwardly from a predetermined intermediate position with a predetermined intermediate lift to its fully open position; the upper guide of the needle valve having a diameter greater than both the inner ring and valve seat and the inner ring having a diameter greater than the valve seat to provide two differential areas for hydraulically opening the needle valve against the bias of the spring means; the upper fuel chamber being connected to receive periodic high pressure pulses of fuel for opening the needle valve against the bias of the spring means and for supplying fuel for fuel injection through the hole means; the outer rinq forming an outer metering ring with an internal, annular metering surface; the inner ring forming an inner metering ring with an external annular, metering surface; the inner metering ring, with the needle valve in its closed position, being received within the outer metering ring with a predetermined axial overlap greater than said predetermined intermediate lift and with a predetermined clearance between the inner and outer metering surfaces providing a metering passageway to regulate fuel flow between the upper and lower fuel chambers during predetermined opening movement of the needle valve from its closed position greater than said intermediate lift and to regulate the pressure in the lower fuel chamber durinq the last part of the closing movement of the needle valve.*

*20. A fuel injector according to claim 19 wherein the fuel injector is a hole type injector in which the nozzle body has a nozzle tip below the needle valve enclosing the lower end of the valve bore and said hole means comprises one or more spray holes connected to the valve bore below the valve seat.*

*21. A fuel injector according to claim 19 wherein said clearance is an annular clearance between the inner and outer metering surfaces.*

*22. A fuel injector according to claim 19 wherein said axial overlap is.greater than said predetermined intermediate lift in the range of 0.001 to 0.005 inch.*

*23. A fuel injector according to claim 21 wherein said annular clearance is a diametrical clearance in the range of 0.0003 to 0.0006 inch in the closed position of the needle valve.*

*24. A fuel injector according to claim 19 wherein said axial overlap is no greater than approximately 0.008 inch.*

*25. A fuel injector according to claim 19 wherein the inner ring metering surface is cylindrical.*

*26. A fuel injector according to claim 19 wherein the outer ring metering surface is cylindrical.*

*27. A method of fuel injection with a fuel injector comprising a nozzle body with an elongated valve bore, an annular valve seat and longitudinally spaced, coaxial, upper valve guide and lower outer valve ring above the valve seat; an elongated needle valve in the valve bore having longitudinally spaced, coaxial, upper guide and lower inner ring which cooperate with the valve guide and outer ring respectively of the nozzle body to provide axial movement of the needle valve within the valve bore between a lower closed position in engagement with the valve seat and an upper fully open position having a predetermined maximum lift; the nozzle body having hole means connected to the valve bore below the valve seat for injection of fuel; the nozzle body providing an upper fuel chamber surrounding the needle valve between the Upper valve guide and outer ring and a lower fuel chamber surrounding the needle valve between the outer ring and valve seat; closure spring means biasing the needle valve downwardly into engagement with the valve seat, including first stage spring means holding the needle valve in its closed position and biasing the needle valve downwardly as it is lifted upwardly from its closed to its fully open position and second stage spring means biasing the needle valve downwardly as it is lifted upwardly from a predetermined intermediate position with a predetermined intermediate lift to its fully open position; the upper guide of the needle valve having a diameter greater than both the inner ring and valve seat and the inner ring having a diameter greater than the valve seat to provide two differential areas for hydraulically opening the needle valve against the bias of the spring means; the upper fuel chamber being connected to receive high pressure pulses of fuel for opening the needle valve against the bias of the spring means and for supplying fuel for fuel injection through the hole means; the method comprising the steps of providing predetermined fuel metering.passage between the outer and inner rings of the nozzle body and needle valve for metering fuel between the upper and lower fuel chambers during predetermined.opening movement of the needle valve from its closed position greater than said predetermined intermediate lift and during the last part of the closing movement of the needle valve, thereby to regulate the rate of fuel injection during said predetermined opening movement and the pressure in the lower fuel chamber during said last part of closing movement.*

*28. A fuel injection method according to claim 27 wherein said predetermined opening movement is approximately one half said predetermined lift.*

*29. A fuel injection method according to claim 27 wherein said predetermined opening movement is greater than said predetermined intermediate lift in the range of 0.001 to 0.005 inch.*

*30. A fuel injection method according to claim 27 wherein said predetermined opening movement is in the range of 0.004 to 0.008 inch.*

*31. A fuel injection method according to claim 27 wherein said predetermined maximum lift is in the range of 0.008 to 0.016 inch.*

*32. A fuel injection method according to claim 27 wherein said metering passage is provided by an annular clearance passageway between the outer and inner rings of the nozzle body and needle valve having a diametral clearance in the range of 0.0003 to 0.0006 inch in the closed position of the needle valve.*

* * * * *

UNITED STATES PATENT AND TRADEMARK OFFICE

CERTIFICATE OF CORRECTION

PATENT NO. : Re. 35,101

DATED : November 28, 1995

INVENTOR(S) : William W. Kelly

It is certified that error appears in the above-indentified patent and that said Letters Patent is hereby corrected as shown below:

Column 8, line 5, change "tile" to --the--.
Column 9, line 10, change "dosed" to --closed--;
line 32, change "tiaough" to --through--.
Column 10, line 34, change "rinq" to --ring--.
Column 11, line 17, change "Upper" to --upper--.
Column 12, line 3, before "predetermined" insert --a--.

Signed and Sealed this

Fourth Day of February, 1997

*Attest:*

Bruce Lehman

BRUCE LEHMAN

*Attesting Officer*

*Commissioner of Patents and Trademarks*